United States Patent
Schaefer et al.

(10) Patent No.: US 9,158,532 B2
(45) Date of Patent: Oct. 13, 2015

(54) METHODS FOR MANAGING APPLICATIONS USING SEMANTIC MODELING AND TAGGING AND DEVICES THEREOF

(71) Applicant: PTC Inc., Needham, MA (US)

(72) Inventors: John Schaefer, Ambler, PA (US); Rick Bullotta, Phoenixville, PA (US); Lawrence Fan, Irvine, CA (US); Brandon Hahr, Irvine, CA (US); Philip J. Huber, Newport Beach, CA (US); Samuel T. Malapas, Irvine, CA (US)

(73) Assignee: PTC Inc., Needham, MA (US)

( * ) Notice: Subject to any disclaimer, the term of this patent is extended or adjusted under 35 U.S.C. 154(b) by 0 days.

(21) Appl. No.: 14/212,620

(22) Filed: Mar. 14, 2014

(65) Prior Publication Data
US 2014/0282370 A1 Sep. 18, 2014

Related U.S. Application Data

(60) Provisional application No. 61/793,627, filed on Mar. 15, 2013.

(51) Int. Cl.
*G06F 9/44* (2006.01)

(52) U.S. Cl.
CPC ... *G06F 8/70* (2013.01); *G06F 8/35* (2013.01)

(58) Field of Classification Search
CPC ..................................... G06F 8/35; G06F 8/70
USPC ......................................................... 717/105
See application file for complete search history.

(56) References Cited

U.S. PATENT DOCUMENTS

| | | | |
|---|---|---|---|
| 3,656,112 A | 4/1972 | Paull | |
| 3,916,412 A | 10/1975 | Amoroso, Jr. | |
| 3,983,484 A | 9/1976 | Hodama | |
| 4,063,173 A | 12/1977 | Nelson et al. | |
| 4,103,250 A | 7/1978 | Jackson | |
| 4,134,068 A | 1/1979 | Richardson | |

(Continued)

FOREIGN PATENT DOCUMENTS

| | | |
|---|---|---|
| WO | WO-2008/115995 A1 | 9/2008 |
| WO | WO-2014/145084 A1 | 9/2014 |

OTHER PUBLICATIONS

Axelsen et al. "Package Templates: A Definition by Semantics-Preserving Source-to-Source Transformations to Efficient Java Code" Proceeding GPCE '12 Proceedings of the 11th International Conference on Generative Programming and Component Engineering pp. 50-59 ACM New York, NY, USA © 2012.*

(Continued)

*Primary Examiner* — Marina Lee
(74) *Attorney, Agent, or Firm* — Choate, Hall & Steart LLP; William R. Haulbrook; Santiago Velez

(57) ABSTRACT

The present disclosure provides a system and method for managing data using semantic tags. The method may include providing a data model corresponding to a first set of tangible objects where the data model includes a first template class having both properties describing the set of tangible object and a set of semantic tags corresponding to the properties. The method may include receiving a class definition for a second template class for a second set of tangible objects where the second template class inherits, by the class definition, the properties and the semantic tags for the second set of tangible objects.

24 Claims, 3 Drawing Sheets

(56) References Cited

U.S. PATENT DOCUMENTS

| | | |
|---|---|---|
| 4,216,546 A | 8/1980 | Litt |
| 4,554,668 A | 11/1985 | Deman et al. |
| 4,601,059 A | 7/1986 | Gammenthaler |
| 4,680,582 A | 7/1987 | Mejia |
| 4,704,585 A | 11/1987 | Lind |
| 4,979,170 A | 12/1990 | Gilhousen et al. |
| 5,113,416 A | 5/1992 | Lindell |
| 5,134,615 A | 7/1992 | Freeburg et al. |
| 5,159,704 A | 10/1992 | Pirolli et al. |
| 5,276,703 A | 1/1994 | Budin et al. |
| 5,361,401 A | 11/1994 | Pirillo |
| 5,422,889 A | 6/1995 | Sevenhans et al. |
| 5,454,010 A | 9/1995 | Leveque |
| 5,479,441 A | 12/1995 | Tymes et al. |
| 5,493,671 A | 2/1996 | Pitt et al. |
| 5,515,365 A | 5/1996 | Sumner et al. |
| 5,734,966 A | 3/1998 | Farrer et al. |
| 5,737,609 A | 4/1998 | Reed et al. |
| 5,805,442 A | 9/1998 | Crater et al. |
| 5,909,640 A | 6/1999 | Farrer et al. |
| 5,925,100 A | 7/1999 | Drewry et al. |
| 6,169,992 B1 | 1/2001 | Beall et al. |
| 6,182,252 B1 | 1/2001 | Wong et al. |
| 6,198,480 B1 | 3/2001 | Cotugno et al. |
| 6,377,162 B1 | 4/2002 | Delestienne et al. |
| 6,430,602 B1 | 8/2002 | Kay et al. |
| 6,553,405 B1 | 4/2003 | Desrochers |
| 6,618,709 B1 | 9/2003 | Sneeringer |
| 6,675,193 B1 | 1/2004 | Slavin et al. |
| 6,757,714 B1 | 6/2004 | Hansen |
| 6,766,361 B1 | 7/2004 | Venigalla |
| 6,797,921 B1 | 9/2004 | Niedereder et al. |
| 6,810,522 B2 | 10/2004 | Cook et al. |
| 6,813,587 B2 | 11/2004 | McIntyre et al. |
| 6,850,255 B2 | 2/2005 | Muschetto |
| 6,859,757 B2 | 2/2005 | Muehl et al. |
| 6,915,330 B2 | 7/2005 | Hardy et al. |
| 6,993,555 B2 | 1/2006 | Kay et al. |
| 7,031,520 B2 | 4/2006 | Tunney |
| 7,046,134 B2 | 5/2006 | Hansen |
| 7,047,159 B2 | 5/2006 | Muehl et al. |
| 7,054,922 B2 | 5/2006 | Kinney et al. |
| 7,082,383 B2 | 7/2006 | Baust et al. |
| 7,082,460 B2 | 7/2006 | Hansen et al. |
| 7,117,239 B1 | 10/2006 | Hansen |
| 7,149,792 B1 | 12/2006 | Hansen et al. |
| 7,178,149 B2 | 2/2007 | Hansen |
| 7,185,014 B1 * | 2/2007 | Hansen .................. 1/1 |
| 7,250,862 B2 | 7/2007 | Bornhoevd et al. |
| 7,254,601 B2 | 8/2007 | Baller et al. |
| 7,269,732 B2 | 9/2007 | Kilian-Kehr |
| 7,341,197 B2 | 3/2008 | Muehl et al. |
| 7,380,236 B2 | 5/2008 | Hawley |
| 7,496,911 B2 | 2/2009 | Rowley et al. |
| 7,529,750 B2 | 5/2009 | Bair |
| 7,536,673 B2 | 5/2009 | Brendle et al. |
| 7,555,355 B2 | 6/2009 | Meyer |
| 7,566,005 B2 | 7/2009 | Heusermann et al. |
| 7,570,755 B2 | 8/2009 | Williams et al. |
| 7,587,251 B2 | 9/2009 | Hopsecger |
| 7,591,006 B2 | 9/2009 | Werner |
| 7,593,917 B2 | 9/2009 | Werner |
| 7,613,290 B2 | 11/2009 | Williams et al. |
| 7,616,642 B2 | 11/2009 | Anke et al. |
| 7,617,198 B2 | 11/2009 | Durvasula |
| 7,624,092 B2 | 11/2009 | Lieske et al. |
| 7,624,371 B2 | 11/2009 | Kulkarni et al. |
| 7,644,120 B2 | 1/2010 | Todorov et al. |
| 7,644,129 B2 | 1/2010 | Videlov |
| 7,647,407 B2 | 1/2010 | Omshehe et al. |
| 7,650,607 B2 | 1/2010 | Resnick et al. |
| 7,653,902 B2 | 1/2010 | Bozak et al. |
| 7,673,141 B2 | 3/2010 | Kilian-Kehr et al. |
| 7,684,621 B2 | 3/2010 | Tunney |
| 7,703,024 B2 | 4/2010 | Kautzleben et al. |
| 7,707,550 B2 | 4/2010 | Resnick et al. |
| 7,725,815 B2 | 5/2010 | Peters |
| 7,728,838 B2 | 6/2010 | Forney et al. |
| 7,730,498 B2 | 6/2010 | Resnick et al. |
| 7,743,015 B2 | 6/2010 | Schmitt |
| 7,743,155 B2 | 6/2010 | Pisharody et al. |
| 7,752,335 B2 | 7/2010 | Boxenhorn |
| 7,757,234 B2 | 7/2010 | Krebs |
| 7,761,354 B2 | 7/2010 | Kling et al. |
| 7,774,369 B2 | 8/2010 | Herzog et al. |
| 7,779,089 B2 | 8/2010 | Hessmer et al. |
| 7,779,383 B2 | 8/2010 | Bornhoevd et al. |
| 7,783,984 B2 | 8/2010 | Roediger et al. |
| 7,802,238 B2 | 9/2010 | Clinton |
| 7,814,044 B2 | 10/2010 | Schwerk |
| 7,814,208 B2 | 10/2010 | Stephenson et al. |
| 7,817,039 B2 | 10/2010 | Bornhoevd et al. |
| 7,827,169 B2 | 11/2010 | Enenkiel |
| 7,831,600 B2 | 11/2010 | Kilian |
| 7,840,701 B2 | 11/2010 | Hsu et al. |
| 7,852,861 B2 | 12/2010 | Wu et al. |
| 7,853,241 B1 | 12/2010 | Harrison |
| 7,853,924 B2 | 12/2010 | Curran |
| 7,860,968 B2 | 12/2010 | Bornhoevd et al. |
| 7,865,442 B1 | 1/2011 | Sowell |
| 7,865,731 B2 | 1/2011 | Kilian-Kehr |
| 7,865,939 B2 | 1/2011 | Schuster |
| 7,873,666 B2 | 1/2011 | Sauermann |
| 7,882,148 B2 | 2/2011 | Werner et al. |
| 7,886,278 B2 | 2/2011 | Stulski |
| 7,890,388 B2 | 2/2011 | Mariotti |
| 7,890,568 B2 | 2/2011 | Belenki |
| 7,895,115 B2 | 2/2011 | Bayyapu et al. |
| 7,899,777 B2 | 3/2011 | Baier et al. |
| 7,899,803 B2 | 3/2011 | Cotter et al. |
| 7,908,278 B2 | 3/2011 | Akkiraju et al. |
| 7,917,629 B2 | 3/2011 | Werner |
| 7,921,137 B2 | 4/2011 | Lieske et al. |
| 7,921,686 B2 | 4/2011 | Bagepalli et al. |
| 7,925,979 B2 | 4/2011 | Forney et al. |
| 7,937,370 B2 | 5/2011 | Hansen |
| 7,937,408 B2 | 5/2011 | Stuhec |
| 7,945,691 B2 | 5/2011 | Dharamshi |
| 7,953,219 B2 | 5/2011 | Freedman et al. |
| 7,954,107 B2 | 5/2011 | Mao et al. |
| 7,954,115 B2 | 5/2011 | Gisolfi |
| 7,966,418 B2 | 6/2011 | Shedrinsky |
| 7,975,024 B2 | 7/2011 | Nudler |
| 7,987,176 B2 | 7/2011 | Latzina et al. |
| 7,987,193 B2 | 7/2011 | Ganapam et al. |
| 7,992,200 B2 | 8/2011 | Kuehr-McLaren et al. |
| 8,000,991 B2 | 8/2011 | Montagut |
| 8,005,879 B2 | 8/2011 | Bornhoevd et al. |
| 8,024,218 B2 | 9/2011 | Kumar et al. |
| 8,024,743 B2 | 9/2011 | Werner |
| 8,051,045 B2 | 11/2011 | Vogler |
| 8,055,758 B2 | 11/2011 | Hansen |
| 8,055,787 B2 | 11/2011 | Victor et al. |
| 8,060,886 B2 | 11/2011 | Hansen |
| 8,065,397 B2 | 11/2011 | Taylor et al. |
| 8,069,362 B2 | 11/2011 | Gebhart et al. |
| 8,073,331 B1 | 12/2011 | Mazed |
| 8,074,215 B2 | 12/2011 | Cohen et al. |
| 8,081,584 B2 | 12/2011 | Thibault et al. |
| 8,082,322 B1 | 12/2011 | Pascarella et al. |
| 8,090,452 B2 | 1/2012 | Johnson et al. |
| 8,090,552 B2 | 1/2012 | Henry et al. |
| 8,095,632 B2 | 1/2012 | Hessmer et al. |
| 8,108,543 B2 * | 1/2012 | Hansen ................ 709/232 |
| 8,126,903 B2 | 2/2012 | Lehmann et al. |
| 8,127,237 B2 | 2/2012 | Beringer |
| 8,131,694 B2 | 3/2012 | Bender et al. |
| 8,131,838 B2 | 3/2012 | Bornhoevd et al. |
| 8,136,034 B2 | 3/2012 | Stanton et al. |
| 8,145,468 B2 | 3/2012 | Fritzsche et al. |
| 8,145,681 B2 | 3/2012 | Macaleer et al. |
| 8,151,257 B2 | 4/2012 | Zachmann |
| 8,156,117 B2 | 4/2012 | Krylov et al. |
| 8,156,208 B2 | 4/2012 | Bornhoevd et al. |

(56) References Cited

U.S. PATENT DOCUMENTS

| | | | |
|---|---|---|---|
| 8,156,473 B2 | 4/2012 | Heidasch | |
| 8,183,995 B2 | 5/2012 | Wang et al. | |
| 8,219,572 B2 * | 7/2012 | Ghosh et al. | 707/758 |
| 8,229,944 B2 | 7/2012 | Latzina et al. | |
| 8,230,333 B2 | 7/2012 | Decherd et al. | |
| 8,249,906 B2 | 8/2012 | Ponce de Leon | |
| 8,250,169 B2 | 8/2012 | Beringer et al. | |
| 8,254,249 B2 | 8/2012 | Wen et al. | |
| 8,261,193 B1 | 9/2012 | Alur et al. | |
| 8,271,935 B2 | 9/2012 | Lewis | |
| 8,280,009 B2 | 10/2012 | Stepanian | |
| 8,284,033 B2 | 10/2012 | Moran | |
| 8,285,807 B2 | 10/2012 | Slavin et al. | |
| 8,291,039 B2 | 10/2012 | Shedrinsky | |
| 8,291,475 B2 | 10/2012 | Jackson et al. | |
| 8,296,198 B2 | 10/2012 | Bhatt et al. | |
| 8,296,266 B2 | 10/2012 | Lehmann et al. | |
| 8,296,413 B2 | 10/2012 | Bornhoevd et al. | |
| 8,301,770 B2 | 10/2012 | van Coppenolle et al. | |
| 8,306,635 B2 | 11/2012 | Pryor | |
| 8,312,383 B2 | 11/2012 | Gilfix | |
| 8,321,790 B2 | 11/2012 | Sherrill et al. | |
| 8,321,792 B1 | 11/2012 | Alur et al. | |
| 8,331,855 B2 | 12/2012 | Williams et al. | |
| 8,346,520 B2 | 1/2013 | Lu et al. | |
| 8,359,116 B2 | 1/2013 | Manthey | |
| 8,364,300 B2 | 1/2013 | Pouyez et al. | |
| 8,370,479 B2 | 2/2013 | Hart et al. | |
| 8,370,826 B2 | 2/2013 | Johnson et al. | |
| 8,375,292 B2 | 2/2013 | Coffman et al. | |
| 8,375,362 B1 | 2/2013 | Brette et al. | |
| RE44,110 E | 3/2013 | Venigalla | |
| 8,392,116 B2 | 3/2013 | Lehmann et al. | |
| 8,392,561 B1 | 3/2013 | Dyer et al. | |
| 8,396,929 B2 | 3/2013 | Helfman et al. | |
| 8,397,056 B1 | 3/2013 | Malks et al. | |
| 8,406,119 B2 | 3/2013 | Taylor et al. | |
| 8,412,579 B2 | 4/2013 | Gonzalez | |
| 8,417,764 B2 | 4/2013 | Fletcher et al. | |
| 8,417,854 B2 | 4/2013 | Weng et al. | |
| 8,423,418 B2 | 4/2013 | Hald et al. | |
| 8,424,058 B2 | 4/2013 | Vinogradov et al. | |
| 8,433,664 B2 | 4/2013 | Ziegler et al. | |
| 8,433,815 B2 | 4/2013 | van Coppenolle et al. | |
| 8,438,132 B1 | 5/2013 | Dziuk et al. | |
| 8,442,933 B2 | 5/2013 | Baier et al. | |
| 8,442,999 B2 | 5/2013 | Gorelik et al. | |
| 8,443,069 B2 | 5/2013 | Bagepalli et al. | |
| 8,443,071 B2 | 5/2013 | Lu et al. | |
| 8,457,996 B2 | 6/2013 | Winkler et al. | |
| 8,458,189 B1 | 6/2013 | Ludwig et al. | |
| 8,458,315 B2 | 6/2013 | Miche et al. | |
| 8,458,596 B1 | 6/2013 | Malks et al. | |
| 8,458,600 B2 | 6/2013 | Dheap et al. | |
| 8,473,317 B2 | 6/2013 | Santoso et al. | |
| 8,478,861 B2 | 7/2013 | Taylor et al. | |
| 8,484,156 B2 | 7/2013 | Hancsarik et al. | |
| 8,489,527 B2 | 7/2013 | van Coppenolle et al. | |
| 8,490,047 B2 | 7/2013 | Petschnigg et al. | |
| 8,490,876 B2 | 7/2013 | Tan et al. | |
| 8,495,072 B1 | 7/2013 | Kapoor et al. | |
| 8,495,511 B2 | 7/2013 | Redpath | |
| 8,495,683 B2 | 7/2013 | van Coppenolle et al. | |
| 8,516,296 B2 | 8/2013 | Mendu | |
| 8,516,383 B2 | 8/2013 | Bryant et al. | |
| 8,521,621 B1 | 8/2013 | Hetzer et al. | |
| 8,522,217 B2 | 8/2013 | Dutta et al. | |
| 8,522,341 B2 | 8/2013 | Nochta et al. | |
| 8,532,008 B2 | 9/2013 | Das et al. | |
| 8,533,660 B2 | 9/2013 | Mehr et al. | |
| 8,538,799 B2 | 9/2013 | Haller et al. | |
| 8,543,568 B2 | 9/2013 | Wagenblatt | |
| 8,547,838 B2 | 10/2013 | Lee et al. | |
| 8,549,157 B2 | 10/2013 | Schnellbaecher | |
| 8,555,248 B2 | 10/2013 | Brunswig et al. | |
| 8,560,636 B2 | 10/2013 | Kieselbach | |
| 8,560,713 B2 | 10/2013 | Moreira Sa de Souza et al. | |
| 8,566,193 B2 | 10/2013 | Singh et al. | |
| 8,571,908 B2 | 10/2013 | Li et al. | |
| 8,572,107 B2 | 10/2013 | Fan et al. | |
| 8,577,904 B2 | 11/2013 | Marston | |
| 8,578,059 B2 | 11/2013 | Odayappan et al. | |
| 8,578,328 B2 | 11/2013 | Kamiyama et al. | |
| 8,578,330 B2 | 11/2013 | Dreiling et al. | |
| 8,584,082 B2 | 11/2013 | Baird et al. | |
| 8,588,765 B1 | 11/2013 | Harrison | |
| 8,594,023 B2 | 11/2013 | He et al. | |
| 8,635,254 B2 | 1/2014 | Harvey et al. | |
| 8,689,181 B2 | 4/2014 | Biron, III | |
| 8,752,074 B2 | 6/2014 | Hansen | |
| 8,762,454 B2 * | 6/2014 | Kohlhaas et al. | 709/203 |
| 8,762,497 B2 | 6/2014 | Hansen | |
| 8,769,095 B2 | 7/2014 | Hart et al. | |
| 8,788,632 B2 | 7/2014 | Taylor et al. | |
| 8,849,827 B2 * | 9/2014 | Moganti et al. | 707/737 |
| 8,898,294 B2 | 11/2014 | Hansen | |
| 2002/0116550 A1 * | 8/2002 | Hansen | 709/330 |
| 2002/0138596 A1 | 9/2002 | Darwin et al. | |
| 2003/0093710 A1 | 5/2003 | Hashimoto et al. | |
| 2003/0117280 A1 | 6/2003 | Prehn | |
| 2004/0027376 A1 | 2/2004 | Calder et al. | |
| 2004/0133635 A1 | 7/2004 | Spriestersbach et al. | |
| 2004/0158455 A1 * | 8/2004 | Spivack et al. | 704/9 |
| 2004/0158629 A1 | 8/2004 | Herbeck et al. | |
| 2004/0177124 A1 | 9/2004 | Hansen | |
| 2005/0015369 A1 | 1/2005 | Styles et al. | |
| 2005/0021506 A1 | 1/2005 | Sauermann et al. | |
| 2005/0027675 A1 | 2/2005 | Schmitt et al. | |
| 2005/0060186 A1 | 3/2005 | Blowers et al. | |
| 2005/0102362 A1 | 5/2005 | Price et al. | |
| 2005/0198137 A1 | 9/2005 | Pavlik et al. | |
| 2005/0213563 A1 | 9/2005 | Shaffer et al. | |
| 2005/0240427 A1 | 10/2005 | Crichlow | |
| 2005/0289154 A1 | 12/2005 | Weiss et al. | |
| 2006/0186986 A1 | 8/2006 | Ma et al. | |
| 2006/0208871 A1 | 9/2006 | Hansen | |
| 2007/0005736 A1 | 1/2007 | Hansen et al. | |
| 2007/0016557 A1 | 1/2007 | Moore et al. | |
| 2007/0027854 A1 | 2/2007 | Rao et al. | |
| 2007/0027914 A1 | 2/2007 | Agiwal | |
| 2007/0162486 A1 | 7/2007 | Brueggemann et al. | |
| 2007/0174158 A1 | 7/2007 | Bredehoeft et al. | |
| 2007/0260593 A1 | 11/2007 | Delvat | |
| 2007/0266384 A1 | 11/2007 | Labrou et al. | |
| 2007/0300172 A1 | 12/2007 | Runge et al. | |
| 2008/0098085 A1 | 4/2008 | Krane et al. | |
| 2008/0172632 A1 | 7/2008 | Stambaugh | |
| 2008/0208890 A1 | 8/2008 | Milam | |
| 2008/0222599 A1 | 9/2008 | Nathan et al. | |
| 2008/0231414 A1 | 9/2008 | Canosa | |
| 2008/0244594 A1 | 10/2008 | Chen et al. | |
| 2008/0255782 A1 | 10/2008 | Bilac et al. | |
| 2008/0319947 A1 | 12/2008 | Latzina et al. | |
| 2009/0006391 A1 | 1/2009 | Ram | |
| 2009/0119586 A1 * | 5/2009 | Weng et al. | 715/705 |
| 2009/0150431 A1 | 6/2009 | Schmidt et al. | |
| 2009/0193148 A1 | 7/2009 | Jung et al. | |
| 2009/0259442 A1 | 10/2009 | Gandikota et al. | |
| 2009/0265760 A1 | 10/2009 | Zhu et al. | |
| 2009/0299990 A1 | 12/2009 | Setlur et al. | |
| 2009/0300060 A1 | 12/2009 | Beringer et al. | |
| 2009/0319518 A1 | 12/2009 | Koudas et al. | |
| 2009/0327337 A1 * | 12/2009 | Lee et al. | 707/103 R |
| 2010/0017379 A1 | 1/2010 | Naibo et al. | |
| 2010/0017419 A1 | 1/2010 | Francis et al. | |
| 2010/0057702 A1 * | 3/2010 | Ghosh et al. | 707/4 |
| 2010/0064201 A1 | 3/2010 | Baird et al. | |
| 2010/0077001 A1 | 3/2010 | Vogel et al. | |
| 2010/0094843 A1 | 4/2010 | Cras | |
| 2010/0095267 A1 * | 4/2010 | Bouillet et al. | 717/101 |
| 2010/0125584 A1 | 5/2010 | Navas | |
| 2010/0125826 A1 | 5/2010 | Rice et al. | |
| 2010/0250440 A1 | 9/2010 | Wang et al. | |
| 2010/0257242 A1 | 10/2010 | Morris | |

(56) References Cited

U.S. PATENT DOCUMENTS

| | | | |
|---|---|---|---|
| 2010/0286937 A1 | 11/2010 | Hedley et al. | |
| 2010/0287075 A1 | 11/2010 | Herzog et al. | |
| 2010/0293360 A1 | 11/2010 | Schoop et al. | |
| 2011/0078599 A1 | 3/2011 | Guertler et al. | |
| 2011/0078600 A1 | 3/2011 | Guertler et al. | |
| 2011/0099190 A1 | 4/2011 | Kreibe | |
| 2011/0137883 A1 | 6/2011 | Lagad et al. | |
| 2011/0138354 A1 | 6/2011 | Hertenstein et al. | |
| 2011/0145712 A1 | 6/2011 | Pontier et al. | |
| 2011/0145933 A1 | 6/2011 | Gambhir et al. | |
| 2011/0153505 A1 | 6/2011 | Brunswig et al. | |
| 2011/0154226 A1 | 6/2011 | Guertler et al. | |
| 2011/0161409 A1 | 6/2011 | Nair et al. | |
| 2011/0167070 A1* | 7/2011 | Ananthanarayanan et al. | 707/741 |
| 2011/0173203 A1 | 7/2011 | Jung et al. | |
| 2011/0173220 A1 | 7/2011 | Jung et al. | |
| 2011/0173264 A1 | 7/2011 | Kelly | |
| 2011/0208788 A1 | 8/2011 | Heller et al. | |
| 2011/0209069 A1 | 8/2011 | Mohler | |
| 2011/0219327 A1 | 9/2011 | Middleton, Jr. et al. | |
| 2011/0231592 A1 | 9/2011 | Bleier et al. | |
| 2011/0276360 A1 | 11/2011 | Barth et al. | |
| 2011/0307295 A1 | 12/2011 | Steiert et al. | |
| 2011/0307363 A1 | 12/2011 | N et al. | |
| 2011/0307405 A1 | 12/2011 | Hammer et al. | |
| 2011/0320525 A1 | 12/2011 | Agarwal et al. | |
| 2012/0005577 A1 | 1/2012 | Chakra et al. | |
| 2012/0059856 A1 | 3/2012 | Kreibe et al. | |
| 2012/0072435 A1 | 3/2012 | Han | |
| 2012/0072885 A1 | 3/2012 | Taragin et al. | |
| 2012/0078959 A1 | 3/2012 | Cho et al. | |
| 2012/0095973 A1* | 4/2012 | Kehoe et al. | 707/694 |
| 2012/0096429 A1 | 4/2012 | Desai et al. | |
| 2012/0130856 A1* | 5/2012 | Petri et al. | 705/26.61 |
| 2012/0131473 A1 | 5/2012 | Biron, III | |
| 2012/0136649 A1 | 5/2012 | Freising et al. | |
| 2012/0143970 A1 | 6/2012 | Hansen | |
| 2012/0144370 A1 | 6/2012 | Kemmler et al. | |
| 2012/0150859 A1 | 6/2012 | Hu | |
| 2012/0158914 A1 | 6/2012 | Hansen | |
| 2012/0166319 A1 | 6/2012 | Deledda et al. | |
| 2012/0167006 A1 | 6/2012 | Tillert et al. | |
| 2012/0173671 A1 | 7/2012 | Callaghan et al. | |
| 2012/0197488 A1 | 8/2012 | Lee et al. | |
| 2012/0197852 A1 | 8/2012 | Dutta et al. | |
| 2012/0197856 A1 | 8/2012 | Banka et al. | |
| 2012/0197898 A1 | 8/2012 | Pandey et al. | |
| 2012/0197911 A1 | 8/2012 | Banka et al. | |
| 2012/0239381 A1 | 9/2012 | Heidasch | |
| 2012/0239606 A1 | 9/2012 | Heidasch | |
| 2012/0254825 A1 | 10/2012 | Sharma et al. | |
| 2012/0259932 A1 | 10/2012 | Kang et al. | |
| 2012/0284259 A1 | 11/2012 | Jehuda | |
| 2012/0311501 A1 | 12/2012 | Nonez et al. | |
| 2012/0311526 A1 | 12/2012 | DeAnna et al. | |
| 2012/0311547 A1 | 12/2012 | DeAnna et al. | |
| 2012/0324066 A1 | 12/2012 | Alam et al. | |
| 2013/0006400 A1 | 1/2013 | Caceres et al. | |
| 2013/0036137 A1 | 2/2013 | Ollis et al. | |
| 2013/0054563 A1 | 2/2013 | Heidasch | |
| 2013/0060791 A1 | 3/2013 | Szalwinski et al. | |
| 2013/0067031 A1 | 3/2013 | Shedrinsky | |
| 2013/0067302 A1 | 3/2013 | Chen et al. | |
| 2013/0073969 A1 | 3/2013 | Blank et al. | |
| 2013/0080898 A1 | 3/2013 | Lavian et al. | |
| 2013/0110496 A1 | 5/2013 | Heidasch | |
| 2013/0110861 A1 | 5/2013 | Roy et al. | |
| 2013/0124505 A1* | 5/2013 | Bullotta et al. | 707/722 |
| 2013/0124616 A1* | 5/2013 | Bullotta et al. | 709/203 |
| 2013/0125053 A1 | 5/2013 | Brunswig et al. | |
| 2013/0132385 A1* | 5/2013 | Bullotta et al. | 707/736 |
| 2013/0166563 A1 | 6/2013 | Mueller et al. | |
| 2013/0166569 A1 | 6/2013 | Navas | |
| 2013/0173062 A1 | 7/2013 | Koenig-Richardson | |
| 2013/0179565 A1 | 7/2013 | Hart et al. | |
| 2013/0185593 A1 | 7/2013 | Taylor et al. | |
| 2013/0185786 A1 | 7/2013 | Dyer et al. | |
| 2013/0191767 A1 | 7/2013 | Peters et al. | |
| 2013/0207980 A1 | 8/2013 | Ankisettipalli et al. | |
| 2013/0211555 A1 | 8/2013 | Lawson et al. | |
| 2013/0246897 A1 | 9/2013 | O'Donnell | |
| 2013/0262641 A1 | 10/2013 | Zur et al. | |
| 2013/0275344 A1 | 10/2013 | Heidasch | |
| 2013/0275550 A1 | 10/2013 | Lee et al. | |
| 2013/0304581 A1 | 11/2013 | Soroca et al. | |
| 2014/0019432 A1 | 1/2014 | Lunenfeld | |
| 2014/0282370 A1* | 9/2014 | Schaefer et al. | 717/105 |

OTHER PUBLICATIONS

Thirunarayan et al. "Simulating multiple inheritance and generics in Java" Computer Languages 25 (1999) pp. 189-210.*

International Search Report for PCTUS2014029749, 3 pages (Aug. 27, 2014).

Shi, L. et al., Understanding Text Corpora with Multiple Facets, IEEE Symposium on Visual Analytics Science and Technology (VAST), 99-106 (2010).

Written Opinion for PCTUS2014029749, 8 pages (Aug. 27, 2014).

* cited by examiner

METHODS FOR MANAGING APPLICATIONS USING SEMANTIC MODELING AND TAGGING AND DEVICES THEREOF

RELATED APPLICATIONS

This application claims priority to and the benefit of U.S. Provisional Patent Application No. 61/793,627, filed Mar. 15, 2013, the text of which is incorporated herein by reference in its entirety.

BACKGROUND

The process of software development involves research, new development, prototyping, modification and reuse. Additionally, developing dynamic applications requires the content developer to organize, manage and deploy a large quantity of content artifacts. In order to accurately develop the content artifacts, the content developer must create a logical model that reflects the physical world. That model is then broken down into common objects in order to provide the highest level of re-usability of artifacts and the lowest cost of maintaining the application(s). As the complexity of the application increases, the number of the common objects also increases thereby making the process of tracking and maintaining these common objects important.

Currently, existing technologies typically store these common objects at many different memory locations. As a result, a content developer has to manually search through a large number of locations for content artifacts to identify common objects relevant for the development of the application. This manual search process is inefficient, time consuming and tedious.

DETAILED DESCRIPTION

Figure 1:
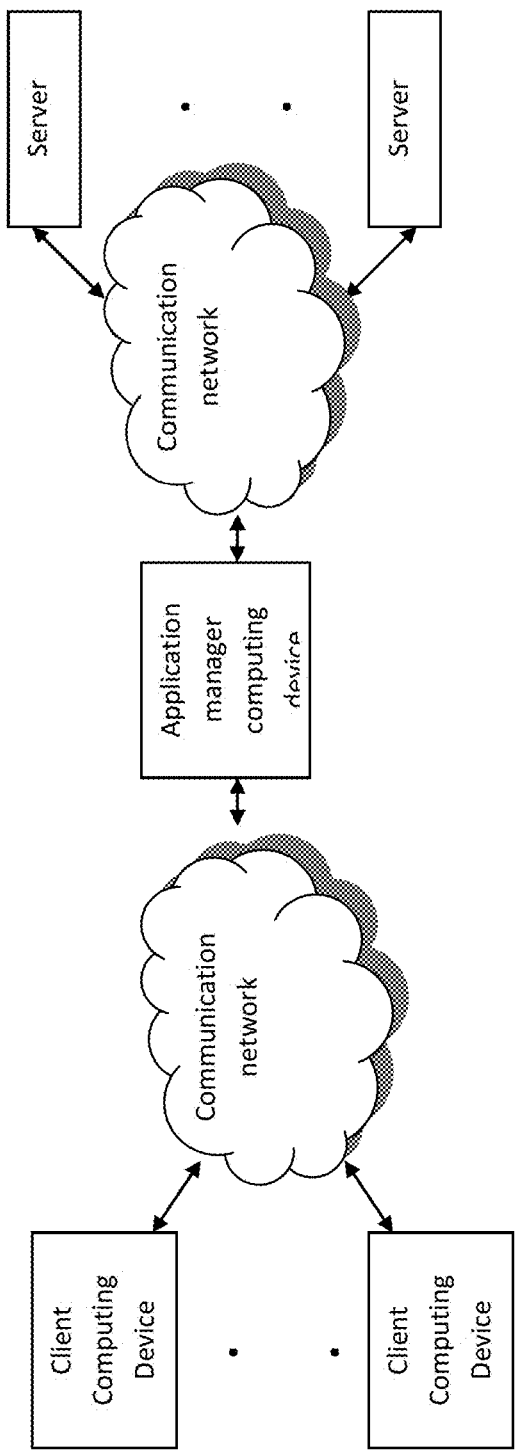
FIG. 1 illustrates an exemplary environment with an application manager computing device that manages application using semantic modeling and tagging.

An exemplary environment with an application manager computing device that manages application using semantic modeling and tagging is illustrated in FIG. 1. In this particular example, the environment includes the application manager computing device, a plurality of client computing devices, a plurality of servers which are all coupled together by one or more communication networks, although this environment can include other numbers and types of systems, devices, components, and elements in other configurations.

Figure 2:
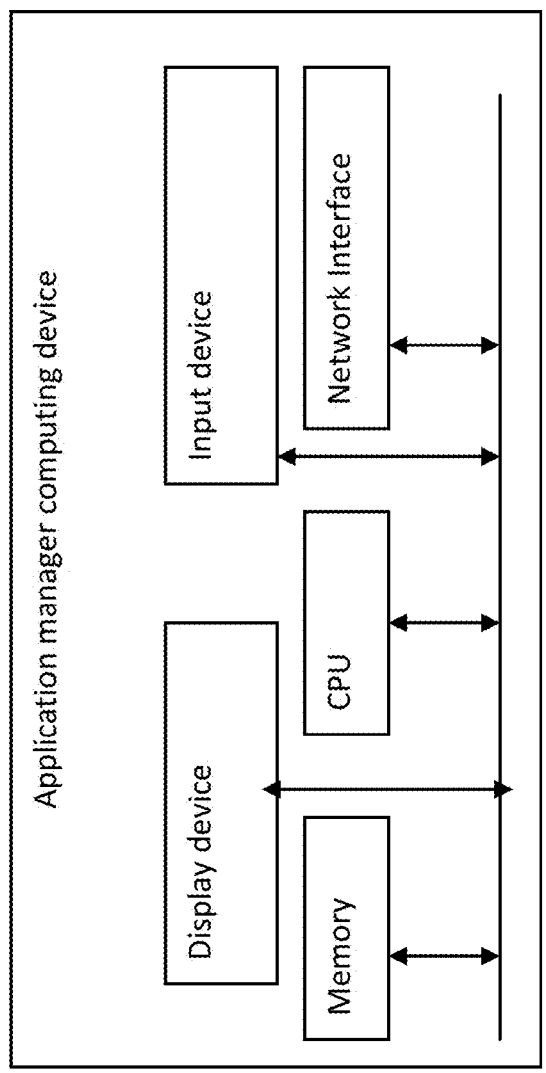
FIG. 2 illustrates an application manager computing device.

Referring to FIGS. 1 and 2, the application manager computing device provides a number of functions including managing application using semantic modeling and tagging, although other types of numbers of computing devices with execute other types and numbers of functions can be used. In this particular example, the application manager computing device includes a central processing unit (CPU) or processor, a memory, an input device, a display device, and a network interface which are coupled together by a bus or other link, although other numbers and types of systems, devices, components, and elements in other configurations and locations can be used.

The processor in the application manager computing device executes a program of stored instructions for one or more aspects of the present technology as described and illustrated by way of the examples herein, although other types and numbers of processing devices and logic could be used and the processor could execute other numbers and types of programmed instructions.

The memory in the application manager computing device stores these programmed instructions for one or more aspects of the present technology is configured to execute these instructions as described and illustrated herein, although some or all of the programmed instructions could be stored and executed or configured for execution elsewhere. A variety of different types of memory storage devices, such as a random access memory (RAM) or a read only memory (ROM) in the system or a floppy disk, hard disk, CD ROM, DVD ROM, or other computer readable medium which is read from and written to by a magnetic, optical, or other reading and writing system that is coupled to the processor in the application manager computing device, can be used for the memory in the application manager computing device.

The input device of the application manager computing device enables a user, such as an administrator, to interact with the application manager computing device, such as to input data and/or to configure, program and/or operate it by way of example only. By way of example only, the input devices may include one or more of a touch screen, keyboard and/or a computer, although other types and numbers of input devices could be used.

The display device of the application manager computing device enables a user, such as an administrator, to view data and/or other information by way of example only. By way of example only, the display device may include one or more of a CRT, LED monitor, or LCD monitor, although other types and numbers of display devices could be used.

The network interface device in the application manager computing device is used to operatively couple and communicate between the application manager computing device and the plurality of client computing devices, the plurality of servers over one or more the communications networks, although other types and numbers of communication networks or systems with other types and numbers of connections and configurations can be used. By way of example only, the one or more the communications networks can use TCP/IP over Ethernet and industry-standard protocols, including NFS, CIFS, SOAP, XML, LDAP, and SNMP, although other types and numbers of communication networks, such as a direct connection, a local area network, a wide area network, modems and phone lines, e-mail, and wireless communication technology, each having their own communications protocols, can be used.

In this particular example, each of the client computing devices and the plurality of servers includes a central processing unit (CPU) or processor, a memory, input/display device interface and a network interface or I/O system, which are coupled together by a bus or other link, although other numbers and types of systems, devices, components, and elements in other configurations can be used.

Each of the client computing devices may utilize the application manager computing device to identify and obtain templates and artifacts for application development, by way of example only, although each of the client computing devices may execute other types and numbers of operations and functions and other types a numbers of computing devices might be coupled to interact with the application manager computing device.

Each of the servers may process requests received from requesting client computing devices via communication networks according to the HTTP-based application RFC protocol or the CIFS or NFS protocol for example. Various network processing applications, such as CIFS applications, NFS applications, HTTP Web Server applications, and/or FTP applications, may be operating on the servers and transmitting data (e.g., files, Web pages) to the application manager computing device in response to requests from the client computing devices. Each of the servers may provide data or receive data in response to requests directed toward the respective applications on the servers from the client computing devices or the application manager computing device. Each of the servers may be hardware or software or may represent a system with multiple servers in a server pool, which may include internal or external networks. In this example the servers may be any version of Microsoft® IIS servers or Apache® servers, although other types of servers may be used.

Although examples of the application manager computing device, the client computing devices and plurality of servers are illustrated and described herein, each of these devices and systems can be implemented on any suitable computer system or computing device. It is to be understood that the devices and systems of the examples described herein are for exemplary purposes, as many variations of the specific hardware and software used to implement the examples are possible, as will be appreciated by those skilled in the relevant art(s).

Furthermore, each of the systems of the examples may be conveniently implemented using one or more general purpose computer systems, microprocessors, digital signal processors, and micro-controllers, programmed according to the teachings of the examples, as described and illustrated herein, and as will be appreciated by those ordinary skill in the art.

In addition, two or more computing devices or systems can be substituted for any one of the systems in any embodiment of the examples. Accordingly, principles and advantages of distributed processing, such as redundancy and replication also can be implemented, as desired, to increase the robustness and performance of the devices and systems of the examples. The examples may also be implemented on computer system or systems that extend across any suitable network using any suitable interface mechanisms and communications technologies, including by way of example only telecommunications in any suitable form (e.g., voice and modem), wireless communications media, wireless communications networks, cellular communications networks, 3G communications networks, Public Switched Telephone Network (PSTNs), Packet Data Networks (PDNs), the Internet, intranets, and combinations thereof.

Figure 3:
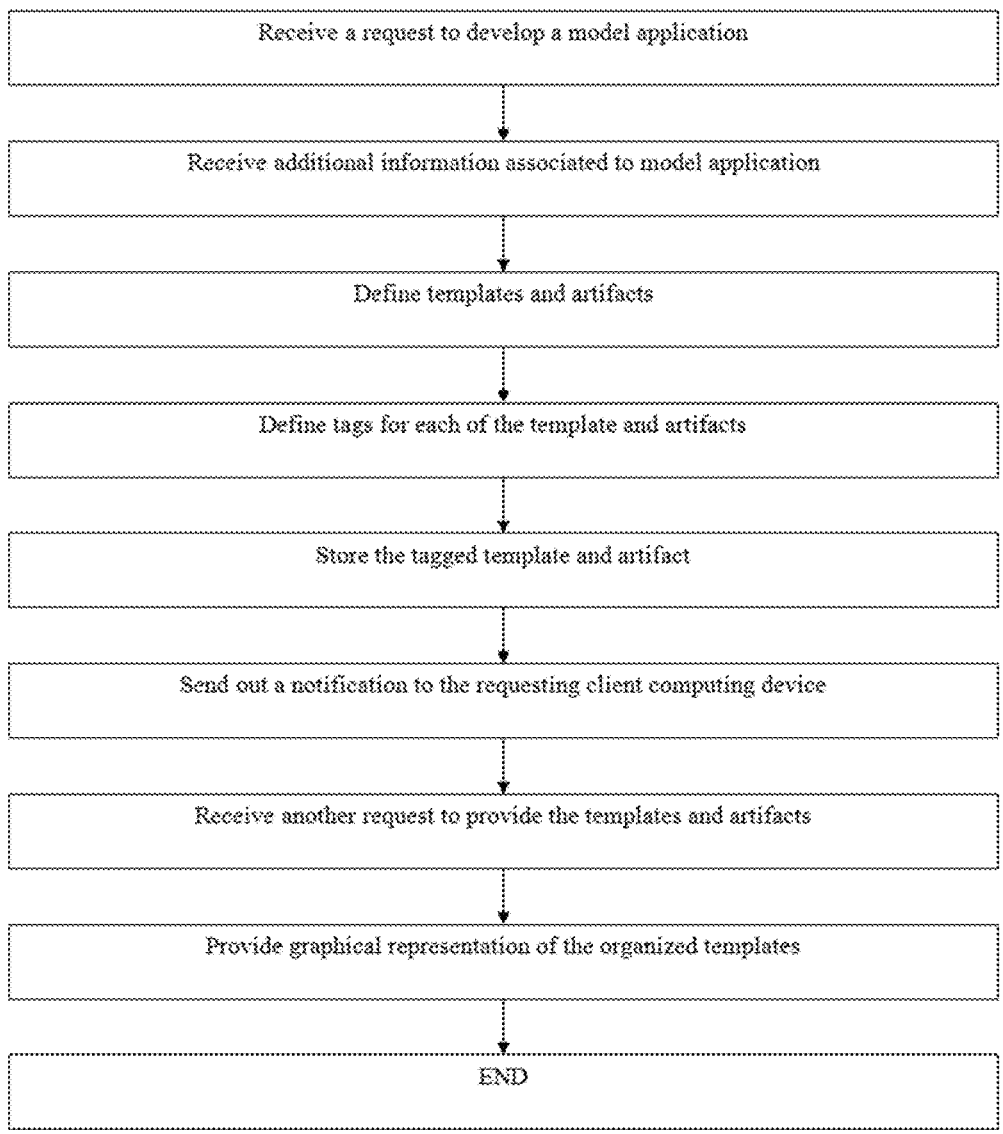
FIG. 3 illustrates exemplary methods for managing applications using semantic modeling and tagging.

The examples may also be embodied as a non-transitory computer readable medium having instructions stored thereon for one or more aspects of the present technology as described and illustrated by way of the examples herein, as described herein, which when executed by a processor, cause the processor to carry out the steps necessary to implement the methods of the examples, as described and illustrated herein. Exemplary methods for managing applications using semantic modeling and tagging will now be described below with reference to FIGS. 1-3.

An exemplary process begins with the application manager computing device receiving a request to develop templates and artifacts for a model from a client computing device, although the application manager computing device may receive any other types of requests from any other devices. By way of example only, the application manager computing device receives a request to develop a model to track and manage delivery of food products to retail outlets in a geographic area to determine the return on investment and the selected geographic area is Philadelphia.

Next, the application manager computing device receives information associated with the request to develop a model from the requesting client computing device. In this example, the application manager computing device receives first level information associated with the geographic region, such as the total number of delivery trucks in this region, number of manufacturing plants and number of warehouses from which the food products are delivered to the retail locations in this particular example. Additionally, the application manager computing device also receives second level information, such as driver information of each truck, capacity of load for each truck and temperature sensor and humidity sensor values for refrigerated trucks in this particular example.

Using the received first level and the second level information, the application manager computing device defines a plurality of templates for the requested model, although the application manager computing device can develop, define, and/or obtain any amounts of other types of artifacts associated with developing the requested model. In this example, the application manager computing device defines a Base_Truck template with properties such as capacity of the truck, driver of the truck, inventory and location. Other characteristics of a truck can also be added to the model, such as services (update a delivery schedule), and events (truck breakdown, delivery times in jeopardy). Additionally, the application manager computing device defines another template for Refrigerated_Truck with properties including capacity of the truck, driver of the truck, inventory, location and temperature and humidity sensor values.

Upon defining a plurality of templates, the application manager computing device organizes the templates and any other developed artifacts by defining semantic tags for each of the created template and artifacts. By way of example only, the application manager computing device defines the semantic tags using an application vocabulary database. The application vocabulary in this example relates to using terms defined in the information to define semantic tags. For purpose of further illustration in this example, the application manager computing device defines tags such as Truck_Tracking and Region to each of the defined templates and artifacts.

Additionally, if the application manager computing device further defines another template Delivery_Truck from previously created template Base_Truck, the application manager computing device will automatically apply all the properties defined in template Base_Truck including the semantic tags associated to the Base_Truck to the recently created template Delivery_Truck. Additionally, if the application manager computing device further defines another template Refrigerated_Delivery_Truck using both Base_Truck and Refrigerated_Truck, the application manager computing device automatically applies all the properties and characteristics defined in Base_Truck and Refrigerated_Truck and assigns the tags associated with both Base_Truck and Refrigerated_Truck to the recently created template Refrigerated_Delivery_Truck.

Further, the application manager computing device stores each of the tagged templates and artifacts within the memory of the application manager computing device, although the application manager computing device can store the templates and artifacts at other locations.

Once the template artifacts have been defined to meet the requirements of the solution, specific instances of templates are created. In this example, each specific delivery truck in the Philadelphia region is instantiated from one of the previously defined templates, and the application manager computing device will automatically apply all the properties and characteristics defined in the template that is defined for that instance. Semantic tags describing the specific instances in the model are also applied.

Next, the application manager computing device sends out a notification to the requesting client computing device indicating completion of defining and organizing the templates and artifacts to the requesting client computing device.

When the application manager computing device receives another request from the requesting client computing device to provide all the defined templates and artifacts associated with the requested model, the application manager computing device provides a graphical representation of the organized templates and the artifacts to the requesting client computing device, although the application manager computing device can provide the templates and the artifacts in any other format. The graphical representation provided by the application manager computing device would include each of the templates and artifacts with their associated tags. In this example, the templates Base_Truck and Refrigerated_Truck would be graphically represented with tags Truck_Tracking and Region-Philly. Additionally, the graphical representation would include the interconnection between each of the template and artifact and accordingly in this example, the graphical representation would indicate that the Delivery_Truck template was inherited from Base_Truck template and Refrigerated_Delivery_Truck template was inherited from Base_Truck and Refrigerated_Truck templates.

The application manager computing device also may provide an option for searching for additional information to the requesting client computing device using the tags. In this particular example, the application manager computing device could provide an option of searching for all artifacts and templates with tag Truck_Tracking Upon receiving the confirmation to search from the client computing device, the application manager computing device searches for all templates and artifacts tagged as Truck_Tracking present within the memory and also the servers and provides the searched results to the requesting client computing device. Additionally, the application manager computing device assists the requesting client computing device to select any of the search results, modify the select search result and finally store the modified content.

The application manager computing device also may provide an option for searching for additional information to the requesting client computing device using the tags, and transporting the relevant content artifacts from one system to another. A typical example is to move the content artifacts for a new application from a development system to a testing system, and finally to a production system using the previously defined semantic tags.

By providing the graphical representation of the templates and artifacts, the technology disclosed provides advantages of assisting the user of the client computing device to understand the created model quickly and effectively. Additionally, by organizing the templates and artifacts using tags, the user of the client computing device can quickly search for any additional information using the tags. Further, by organizing the created artifacts and templates, any new user or developer of the requesting client computing device will be able to quickly understand the model without manually searching for each of the template and artifacts and then trying to understand the connection between them.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method of using semantic tagging to manage templates and artifacts of a data model used for tracking and managing data associated with a plurality of tangible objects, the method comprising:

providing, by a processor of a computing device, a plurality of reusable templates for creating a plurality of data models for managing data associated with a plurality of tangible objects, wherein each reusable template is specific to a type of tangible object, and
wherein the plurality of reusable templates are organized in a hierarchical structure in which one or more reusable templates have a parent relationship to other reusable templates such that contents of each parent template are automatically replicated in corresponding children templates;

receiving, by the processor, a request to tag, with one or more semantic tags for managing the plurality of the reusable templates of the data model, a first reusable template having a parent relationship to one or more child reusable templates,
wherein a semantic tag of the one or more semantic tags comprises a term associated with a content of the first reusable template;

responsive to the request, tagging, by the processor, i) the first reusable template with the semantic tag and ii) each of the one or more child reusable templates, with the one or more semantic tags; and in response to a search request with a tag term, retrieving, by the processor, one or more reusable templates having a semantic tag matching, at least in part, the tag term and causing graphical representation of the retrieved one or more reusable templates.

2. The method as set forth in claim 1 further comprising:
receiving, by the processor, a first level information associated with a parent reusable template and a second level information associated with a child reusable template;
defining, by the processor, a third and fourth reusable templates using the received first level information and the second level information.

3. The method as set forth in claim 1, comprising storing the tagged first reusable template and each of the one or more tagged child reusable templates in persistent memory.

4. The method as set forth in claim 1 further comprising transferring by the processor the provided one or more templates and associated artifacts to a second server using the one or more semantic tags.

5. The method as set forth in claim 1, comprising tagging, by the processor of the computing device, artifacts of the data model with the one or more semantic tags in response to the request to tag the first reusable template, wherein the artifacts are associated with the first reusable template.

6. The method as set forth in claim 1, wherein the contents of the plurality of reusable templates comprise one or more members selected from the group consisting of a property, a service, and an event.

7. The method as set forth in claim 1, comprising:
receiving a selection of a reusable template of the one or more reusable templates; and
creating, using the selected reusable template, one or more first data models for managing data associated with corresponding one or more first tangible objects.

8. The method as set forth in claim 1, wherein the graphical representation presents interconnections between each of one or more retrieved reusable templates.

9. A non-transitory computer readable medium having stored thereon instructions for using semantic tagging to manage templates and artifacts of a data model used for tracking and managing data associated with a plurality of tangible objects, wherein the instructions when executed by at least one processor, causes the processor to:
provide a plurality of reusable templates for creating a plurality of data models for managing data associated with a plurality of tangible objects, wherein each reusable template is specific to a type of tangible object, and wherein the plurality of reusable templates are organized in a hierarchical structure in which one or more reusable templates have a parent relationship to other reusable templates such that contents of each parent template are automatically replicated in corresponding children templates;
receive a request to tag, with one or more semantic tags for managing the plurality of the reusable templates of the data model, a first reusable template having a parent relationship to one or more child reusable templates, wherein a semantic tag of the one or more semantic tags comprises a term associated with a content of the first reusable template;
responsive to the request, tag i) the first reusable template with the semantic tag and ii) each of the one or more child reusable templates, with the one or more semantic tags; and
in response to a search request with a tag term, retrieve one or more reusable templates having a semantic tag matching, at least in part, the tag term and causing graphical representation of the retrieved one or more reusable templates.

10. The computer readable medium as set forth in claim 9, wherein the instructions, when executed by the processor, cause the processor to:
receive a first level information associated with a parent reusable template and a second level information associated with a child reusable template;
define a third and fourth reusable templates using the received first level information and the second level information.

11. The computer readable medium as set forth in claim 9, wherein the instructions, when executed by the processor, cause the processor to store the tagged first reusable template and each of the one or more tagged child reusable templates in persistent memory.

12. The computer readable medium as set forth in claim 9, wherein the instructions, when executed by the processor, cause the processor to transfer the provided one or more templates and associated artifacts to a second server using the one or more semantic tags.

13. The computer readable medium as set forth in claim 9, wherein the instructions, when executed by the processor, cause the processor to tag artifacts of the data model with the one or more semantic tags in response to the request to tag the first reusable template, wherein the artifacts are associated with the first reusable template.

14. The computer readable medium as set forth in claim 9, wherein the contents of the plurality of reusable templates comprise one or more members selected from the group consisting of a property, a service, and an event.

15. The computer readable medium as set forth in claim 9, wherein the instructions, when executed by the processor, cause the at least one processor to:
receive a selection of a reusable template of the one or more reusable templates; and
create, using the selected reusable template, one or more first data models for managing data associated with corresponding one or more first tangible objects.

16. The computer readable medium as set forth in claim 9, wherein the graphical representation presents interconnections between each of one or more retrieved reusable templates.

17. A device comprising:
one or more processors;
a memory, wherein the memory is coupled to the one or more processors, the memory having stored thereon instructions, wherein the instructions, when executed by the one or more processors, cause the one or more processors to:
provide a plurality of reusable templates for creating a plurality of data models for managing data associated with a plurality of tangible objects, wherein each reusable template is specific to a type of tangible object, and wherein the plurality of reusable templates are organized in a hierarchical structure in which one or more reusable templates have a parent relationship to other reusable templates such that contents of each parent template are automatically replicated in corresponding children templates;
receive a request to tag, with one or more semantic tags for managing the plurality of the reusable templates of the data model, a first reusable template having a parent relationship to one or more child reusable templates, wherein a semantic tag of the one or more semantic tags comprises a term associated with a content of the first reusable template;
in response to a request, tag i) the first reusable template with the semantic tag and ii) each of the one or more child reusable templates, with the one or more semantic tags; and
in response to a search request with a tag term, retrieve one or more reusable templates having a semantic tag matching, at least in part, the tag term and causing graphical representation of the retrieved one or more reusable templates.

18. The device as set forth in claim 17, wherein the instructions, when executed by the processor, further cause the processor to:
receive a first level information associated with a parent reusable template and a second level information associated with a child reusable template;
define a third and fourth reusable templates using the received first level information and the second level information.

19. The device as set forth in claim 18, wherein the instructions, when executed by the processor, cause the processor to tag artifacts of the data model with the one or more semantic tags in response to the request to tag the first reusable template, wherein the artifacts are associated with the first reusable template.

20. The device as set forth in claim 18, wherein the contents of the plurality of reusable templates comprise one or more members selected from the group consisting of a property, a service, and an event.

21. The device as set forth in claim 18, wherein the instructions, when executed by the processor, cause the at least one processor to:
   receive a selection of a reusable template of the one or more reusable templates; and
   create, using the selected reusable template, one or more first data models for managing data associated with corresponding one or more first tangible objects.

22. The device as set forth in claim 18, wherein the graphical representation presents interconnections between each of one or more retrieved reusable templates.

23. The device as set forth in claim 17, wherein the instructions, when executed by the processor, cause the processor to store the tagged first reusable template and each of the one or more tagged child reusable templates in persistent memory.

24. The device as set forth in claim 17, wherein the instructions, when executed by the processor, cause the processor to transfer the provided one or more templates and associated artifacts to a second server using the one or more semantic tags.

* * * * *